US009386371B2

(12) United States Patent
Krishnaswamy et al.

(10) Patent No.: US 9,386,371 B2
(45) Date of Patent: Jul. 5, 2016

(54) PSYCHOACOUSTIC ADAPTIVE NOTCH FILTERING

(71) Applicant: Apple Inc., Cupertino, CA (US)

(72) Inventors: Arvindh Krishnaswamy, San Jose, CA (US); Sean A. Ramprashad, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 384 days.

(21) Appl. No.: 13/790,666

(22) Filed: Mar. 8, 2013

(65) Prior Publication Data

US 2013/0329909 A1 Dec. 12, 2013

Related U.S. Application Data

(60) Provisional application No. 61/657,473, filed on Jun. 8, 2012.

(51) Int. Cl.

*H04B 15/00* (2006.01)
*H04R 3/00* (2006.01)
*G10L 21/0324* (2013.01)
*H04R 5/04* (2006.01)

(52) U.S. Cl.

CPC ............ *H04R 3/002* (2013.01); *G10L 21/0324* (2013.01); *H04R 3/00* (2013.01); *H04R 5/04* (2013.01)

(58) Field of Classification Search

CPC . G10L 21/02; G10L 21/0208; G10L 21/0324; G10L 21/0216
USPC .............................. 381/94.2, 94.1, 94.6, 94.7
See application file for complete search history.

(56) References Cited

U.S. PATENT DOCUMENTS 8,204,884 B2 * 6/2012 Freedman et al. ............ 707/737
2002/0008777 A1 * 1/2002 Ovadia et al. ................ 348/470
2007/0047626 A1 * 3/2007 Elias ............................ 375/141

* cited by examiner

*Primary Examiner* — Thjuan K Addy
(74) *Attorney, Agent, or Firm* — Blakely, Sokoloff, Taylor & Zafman LLP

(57) ABSTRACT

Improved systems and methods for psychoacoustic adaptive notch filtering are provided. By accounting for psychoacoustic properties of an audio signal as well as finer characteristics of noise which may be present in the audio signal (e.g., the shape of the spectral density of the noise), more effective strategies for dealing with undesirable components of the audio signal may be realized.

21 Claims, 7 Drawing Sheets

PSYCHOACOUSTIC ADAPTIVE NOTCH FILTERING

CROSS-REFERENCE TO RELATED PROVISIONAL APPLICATIONS

This application claims the benefit of U.S. Provisional Patent Application No. 61/657,473 filed on Jun. 8, 2012, the disclosure of which is hereby incorporated herein by reference in its entirety.

FIELD OF THE INVENTION

This disclosure relates to the fields of noise suppressors and perceptual audio coding, and more particularly relates to psychoacoustic adaptive notch filtering.

BACKGROUND OF THE INVENTION

Noise suppressors address the problem of unknown external sources adding noise to an audio signal of interest by attempting to reduce the noise.

Traditional noise suppressors use generic information when dealing with noise because, in general, noise can include one of many types of noise, which may have distinct spectral densities (e.g., white noise, Brownian noise, grey noise, etc.) and/or distinct probability distributions (e.g., Gaussian, Poisson, Cauchy, etc.). Traditional noise suppressors also estimate the level of noise in certain critical bands of frequencies, and based on these estimates, they also perform suppression of the entire critical bands.

In audio coding, an incoming, continuous audio signal may be converted into a predetermined number of discrete bits. As part of this conversion, quantization noise may be added into the audio signal. For example, many audio coders introduce noise in both time and frequency. The key difference between the noise introduced by audio coding compared to noise added by an unknown external source is that the former is added to certain frequency bands in a known way.

Components of a system may also introduce noise into a signal of interest. As with audio coding, the noise introduced by system components may also have deterministic characteristics. For example, electronic components may introduce noise centered around a particular frequency (e.g., noise generated by an electronic component, where the noise can vary, but is known to be concentrated in limited frequencies or limited frequency bands (e.g., based on the characteristics of the electronic component)).

Whenever a noise suppressor performs suppression on a primary signal, distortion of the primary signal can occur. Additionally, if a traditional noise suppressor performs suppression of an entire critical band or a wide band of frequencies, information may be lost. Accordingly, more effective strategies for dealing with undesirable noise components of an audio signal are needed.

SUMMARY OF THE INVENTION

Improved systems and methods for psychoacoustic adaptive notch filtering are provided. By accounting for psychoacoustic properties of an audio signal, as well as finer characteristics of noise that may be present in the audio signal (e.g., the shape of the spectral density of the noise), more effective strategies for dealing with undesirable components of the audio signal may be realized. For example, adaptive notch filtering can be employed to vary the degree of suppression of a narrow (or limited) band of frequencies of an audio signal as a function of the psychoacoustic properties of the signal.

Additionally, adaptive notch filtering may avoid suppressing an entire critical band of the audio signal. Psychoacoustic principles can involve making critical band energy estimates over time. For example, to determine how much a desirable signal (e.g., an audio signal) masks an undesirable signal (i.e., noise), critical band energies of the desirable signal for a range of time t, where t1<=t<=t2, can be used. In at least one embodiment, t can be equal to t1 and t2 (e.g., where only a current energy is used). However, in at least another embodiment, multiple energy samples can be taken over a range of time.

In at least one embodiment, a method for performing adaptive notch filtering is provided. The method can include receiving an input signal, and determining whether tone-like noise is present in a particular critical band of the input signal. In response to a determination that the tone-like noise is present, the method can also include estimating an amplitude of the tone-like noise, and estimating how much energy is contained in the particular critical band. The method can also include determining at least one suppression factor for the tone-like noise based on the estimated amplitude and energy, selecting a notch filter based on the determined at least one suppression factor, and applying the selected notch filter to the input signal.

In at least one embodiment, a method for performing adaptive notch filtering is provided. The method can include receiving an input signal, determining how much energy is contained in at least one predefined frequency band of the input signal, determining a level of tone-like noise present in the at least one predefined band based on the determined amount of energy, selecting a notch filter based on the determined level, and applying the selected notch filter to the input signal.

In at least one embodiment, an electronic is provided. The electronic device can include a receiver configured to receive an input signal, and an adaptive notch filtering system. The filtering system can be configured to determine how much energy is contained in at least one predefined frequency band of the input signal, determine a level of tone-like noise present in the at least one predefined band based on the determined amount of energy, select a notch filter based on the determined level, and apply the selected notch filter to the input signal.

In at least one embodiment, a non-transitory computer readable medium is provided. The computer readable medium can store a program configured to cause a computer to execute an adaptive notch filtering process. The filtering process can include identifying an input signal, determining how much energy is contained in at least one predefined frequency band of the input signal, determining a level of tone-like noise present in the at least one predefined band based on the determined amount of energy, selecting a notch filter based on the determined level, and applying the selected notch filter to the input signal.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION OF THE PREFERRED EMBODIMENTS

Improved systems and methods for psychoacoustic adaptive notch filtering are provided are provided and described with reference to FIGS. 1-8.

Noise in an audio signal can be tone-like and/or noise-like. As used herein, the term "tone-like" is intended to describe signals with at least one discernible peak in their power spectral density. Additionally, a tone-like signal may include more than one peak. The additional peaks may represent harmonics of the discernible peak or may be unrelated to the discernible peak. As used herein, the term "noise-like" is intended to describe signals with a relatively flat power spectral density (e.g., white noise) or a power spectral density that does not contain any easily discernible peaks (e.g., Brownian noise or grey noise). One skilled in the art will appreciate that a given signal may contain both tone-like and noise-like components.

The extent to which an individual perceives noise within an audio signal depends both on the nature of the audio signal (e.g., whether the audio signal is a tone-like signal or whether the audio signal is a noisy signal) and the nature of the noise (e.g., whether the noise is tone-like or noise-like). Traditional noise suppressors, however, only consider the scenario where the noise within the audio signal is noise-like. Noise suppressors are generally agnostic to the case where the noise is tone-like.

Figure 1:
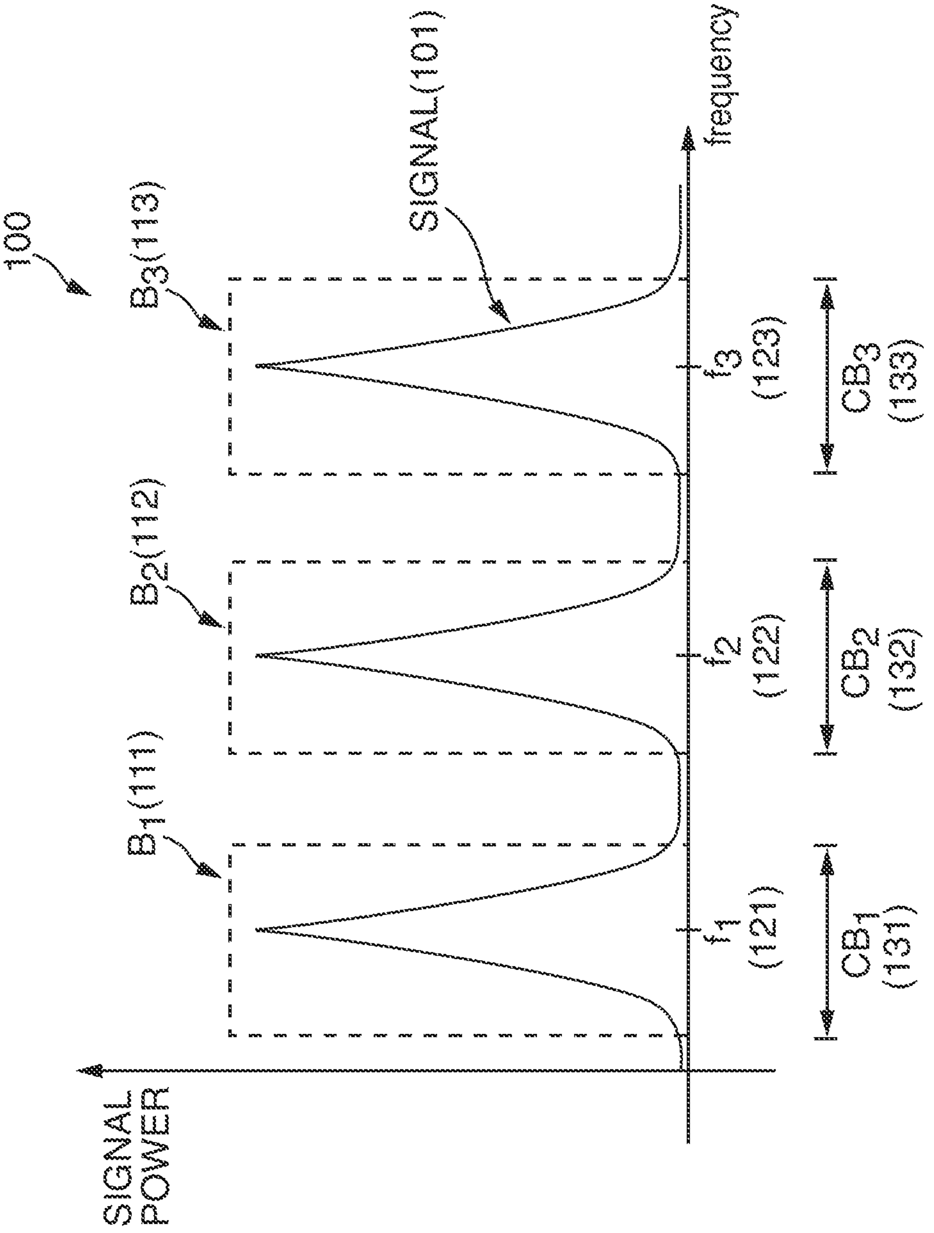
FIG. 1 is an illustration of the power spectral density of tone-like noise components, which may be contained in an audio signal, in accordance with at least one embodiment.

In some situations, noise in an audio signal can be tone-like. Referring now to FIG. 1, graph 100 illustrates the power spectral density of an audio signal that may contain tone-like noise. Signal 101 may include tone-like noise centered at three distinct frequencies (e.g., frequencies 121-123). The tone-like noise centered at frequencies 121-123 may be related. For example, noise located at frequencies 122 and 123 may be harmonics of base frequency 121. Alternatively, the tone-like noise centered at frequencies 121-123 may be unrelated (e.g., generated by three separate sources). For the purposes of illustration and not of limitation, discussion regarding FIG. 1 will assume that signal 101 represents an audio signal containing noise with a known harmonic structure (i.e., frequencies 122 and 123 are harmonics of frequency 121).

The tone-like noise centered at each of frequencies 121-123 may each be contained within bands 131-133, respectively. Bands 131-133 may correspond to critical bands. As used herein, the term "critical band" may refer to a bandwidth in which an individual's auditory frequency-analysis mechanism may be unable to resolve inputs whose frequency difference is smaller than the bandwidth. In order to isolate the energy information of a particular band, band pass filters may be utilized. For example, band-pass filters 111-113 may be used to extract information in bands 131-133. Band pass filters 111-113 may be sized such that their bandwidths correspond to critical bands 131-133, respectively. Although three band pass filters are shown in FIG. 1, it is to be understood that any suitable number of band pass filters may be implemented.

Knowing that the noise contained in signal 101 is tone-like provides additional flexibility when dealing with the noise. For example, the tone-like noise centered at frequency 121 can be targeted using a notch filter. Notch filtering may be advantageous for getting rid of narrow, specific portions of the audio spectrum. As a result, the tone-like noise centered at frequency 121 may be suppressed without requiring suppression of the entirety of band 131. Additionally, that noise centered at frequency 121 is tone-like may allow for varying degrees of suppression (e.g., via notch filters with varying depths) depending on the overall frequency content of signal 101. For example, if signal 101 contains a significant amount of energy in band 131 besides the tone-like noise centered at frequency 121, the noise may be suppressed less than it would otherwise need to be suppressed. Alternatively, the noise may not need to be suppressed at all.

Figure 2:
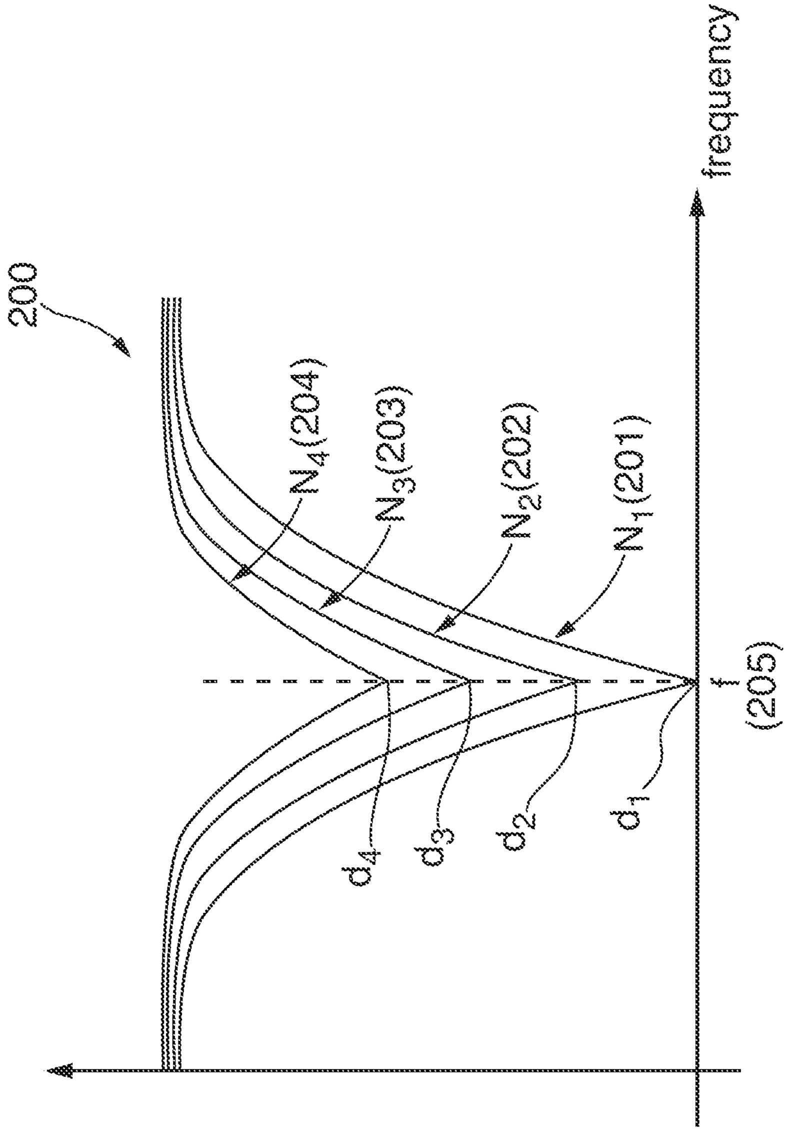
FIG. 2 is an illustrative graph of the frequency response of a family of notch filters, in accordance with at least one embodiment.

FIG. 2 depicts an illustrative graph 200 of the frequency response of a family of notch filters. The family of notch filters may allow for varying degrees of suppression at a given frequency. Notch filters 201-204 may each be centered at frequency 205, respectively. Each of notch filters 201-204 may have a different depth $d_1$-$d_4$, respectively. Therefore, by applying one of notch filters 201-204, varying levels of suppression may be achieved. Although four notch filters are shown in FIG. 2, it is to be understood that any number of notch filters may constitute a family of notch filters. In some embodiments, a family of notch filters may include a continuous number of filter depths. Additionally, frequency 205 may be adjusted to suit any particular application.

Figure 3:
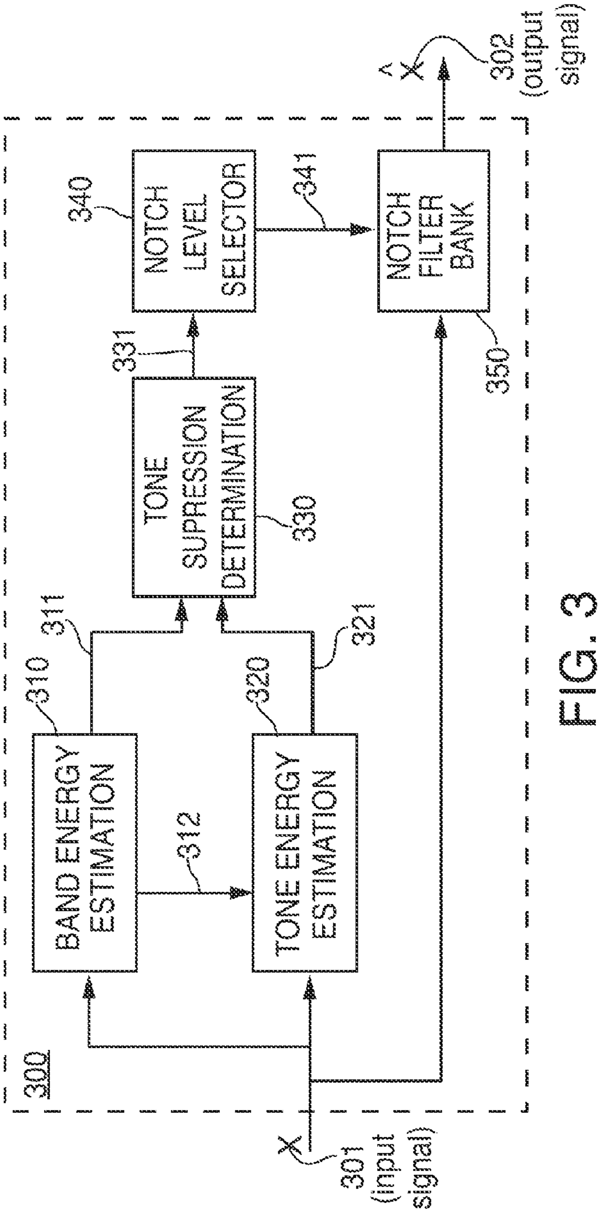
FIG. 3 is a block diagram of a system for performing psychoacoustic adaptive notch filtering, in accordance with at least one embodiment.

FIG. 3 is a block diagram of a system for performing psychoacoustic adaptive notch filtering. System 300 may include a band energy estimation block 310, a tone energy estimation block 320, a tone suppression determination block 330, a notch level selector 340, and a notch filter bank 350. For the purposes of illustration and discussion of system 300, reference will be made to FIG. 1 in connection with FIG. 3. It is understood that references to other figures are merely for illustration and not intended to imply a required combination.

System 300 may accept signal 301 as an input and produce signal 302 as an output. Signal 301 may contain noise similar to the noise described with respect to FIG. 1. For example, signal 301 may contain tone-like noise centered around frequency 121 with harmonics located at frequencies 122 and 123, respectively.

Band energy estimation block 310 may measure the energy contained in a number of bands. To accomplish this task, band energy estimation block 310 may utilize band pass filters. For example, band energy estimation block 310 may implement band pass filters 111-113 shown in FIG. 1. Although three band pass filters are shown in FIG. 1, it is understood that band energy estimation block 310 may implement any suitable number of band pass filters. Band pass filters 111-113 may be applied individually to signal 301, and band energy estimation block 310 may calculate the energy remaining in each of the filtered signals. As a result, band energy estimation block 310 may be able to calculate and store the energy contained in critical bands 131-133, respectively. Band energy estimation block 310 may pass information about the energy contained in bands 131-133 to one or both of tone energy estimation block 320 and tone suppression determination block 330 (e.g., via signals 312 and 311, respectively). Additionally, band energy estimation block 310 may pass the filtered signals that result after applying each band pass filter (e.g., the filtered signal that results after applying band pass filters 111-113) to tone energy estimation block 320 via signal 312.

According to some embodiments, tone energy estimation block 320 may estimate the energy levels of tone-like noise contained in signal 301. Tone energy estimation block 320 may provide real-time estimates of the energy contained in each of a number of tone-like noise components found in signal 301. Tone energy estimation block 320 may operate during quiet periods (e.g., when the overall energy level of signal 301 is below a predetermined level). For example, system 300 may be part of an electronic device (e.g., electronic device 800 described in more detail below) that contains a voice activity detector (not shown), and the voice activity detector may notify tone energy estimation block 320 when a suitable quiet period occurs. Alternatively, a predetermined level of energy that the tone-like noise will not exceed may be defined. Any time signal 301 exceeds the predetermined level, system 300 may recognize that information besides noise (e.g., voice information) may be present in signal 301. When the energy level of signal 301 is below a suitable predetermined level, a tacit assumption may be made that the dominant portion of signal 301 corresponds to tone-like noise.

Tone energy estimation block 320 may obtain its estimates of the energy contained in each of a number of tone-like noise components by utilizing notch filters. For example, tone energy estimation block 320 may target tone-like noise centered around a particular frequency. Tone energy estimation block 320 may make comparisons between filtered and unfiltered versions of signals 301 and/or 312 in order to estimate the energy contained in a particular tone-like noise component. Tone energy estimation block 320 may pass output signal 321 to tone suppression determination block 330. Signal 321 may indicate whether any tone-like noise portions of signal 301 dominate. Alternatively, signal 321 may indicate what percentage of signal 301 corresponds to tone-like noise.

Figure 4:
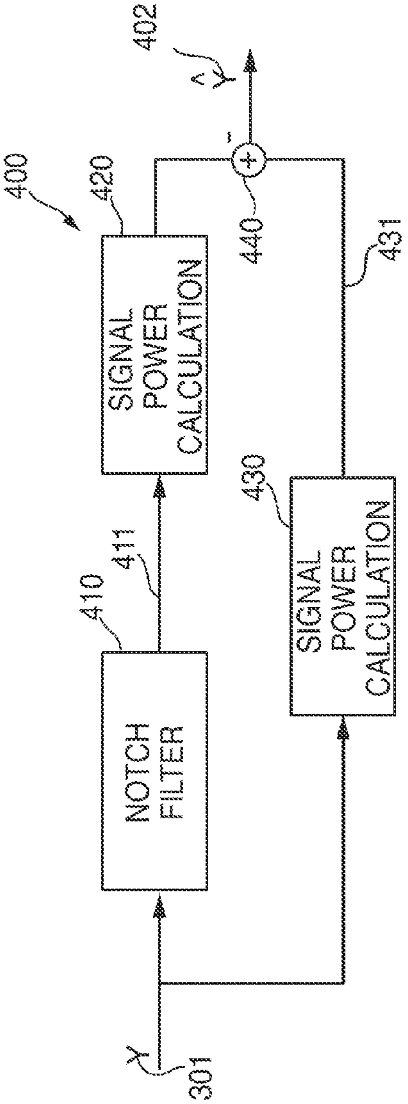
FIG. 4 is an illustrative block diagram of a system for estimating the energy contained in a narrow frequency band, in accordance with at least one embodiment.

FIG. 4 shows an illustrative block diagram of a system for estimating the energy contained in a narrow frequency band. System 400 may include a notch filter block 410, a signal power calculation block 420, and a signal power calculation block 430. In at least one embodiment, signal 401 can be an output signal of a band-pass filter. For illustrative purposes, system 400 may be one implementation of a portion of tone energy estimation block 320. According to some embodiments, system 400 may be included as a part of tone energy estimation block 320. In these embodiments, signal 401 may correspond to signal 312 (or a portion of signal 312) of FIG. 3.

Tone energy estimation block 320 may operate system 400 during suitable quiet periods. Notch filter block 410 may apply a notch filter to incoming signal 401. For example, notch filter block 410 may apply notch filter 201 to signal 401 to target tone-like noise centered around a particular frequency 205. Frequency 205 may correspond to any suitable frequency of an audio signal at which tone-like noise may be present. For example, frequency 205 may correspond to any one of frequencies 121-123. Signal power calculation block 420 may calculate the energy in a filtered signal 411. Similarly, signal power calculation block 430 may calculate the energy in signal 401. The output signals 421 and 431 of signal power calculation blocks 420 and 430 may be compared (e.g., signal 421 may be subtracted from signal 431) via a comparator 440 to generate an output signal 402. Tone energy estimation block 320 may compare signals 401 and 402 in order to estimate the amount of the overall energy of signal 401 that corresponds to the tone-like noise. For example, if the energy of signal 402 is very different from the energy of signal 401 (e.g., the energy of signal 402 is significantly less than the energy of signal 401), then the tone-like noise portion of signal 401 may dominate. Alternatively, if the energy of signal 402 is similar to the energy of signal 401, then the tone-like noise in signal 401 may be dominated by other energy in signal 401.

In some embodiments, tone energy estimation block 320 may operate system 400 multiple times. In these embodiments, the number of operation cycles can correspond to the number of filtered signals received from band energy estimation block 310. Alternatively, tone energy estimation block 320 may employ several systems similar to system 400 concurrently. For example, tone energy estimation block 320 can employ a number of systems that correspond to the number of filtered signals received from band energy estimation block 310.

Referring back to FIG. 3, according to some embodiments, tone energy estimation block 320 may be optional. In embodiments that do not include tone energy estimation block 320, tone-like noise energies may be estimated using off-line experiments (e.g., experiments performed during the assembly of electronic device 800). In these embodiments, estimations of the tone-like noise energies obtained from the off-line experiments may be stored in tone suppression determination block 330.

Tone suppression determination block 330 may receive signals 311 and 321, and may use these signals to determine whether suppression of tone-like noise is necessary. For example, tone suppression determination block 330 may use the information about energy contained within a given band from signal 311 and compare it to the information about whether tone-like noise dominates the given band from signal 321. Using these two pieces of information, tone suppression determination block 330 may determine the level of notch filtering required for the given band. For example, if an audio signal contains no information other than tone-like noise (e.g., a silent room), then a higher level of suppression may be necessary. Tone suppression determination block 330 may perform this determination for each of the bands indicated by signals 311 and 321. Tone suppression determination block 330 may then pass information regarding the level of notch filtering required to notch level selector 340 via a signal 331.

Figure 5:
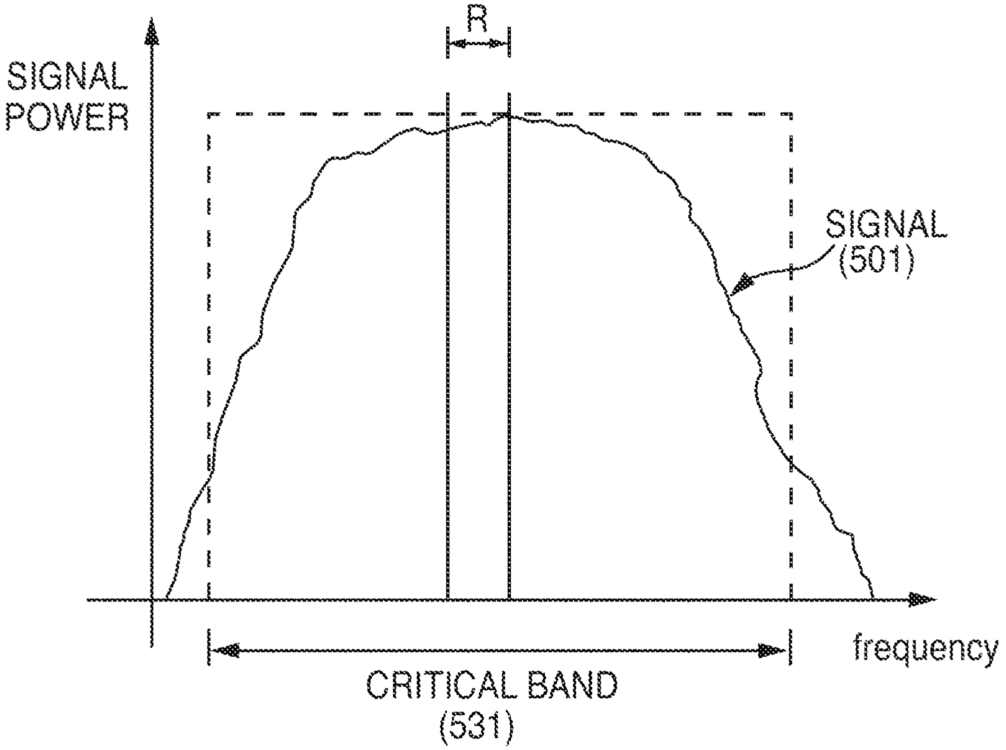
FIG. 5 is an illustrative graph of a signal masking tone-like noise, in accordance with at least one embodiment.

In certain bands, tone suppression determination block 330 may find that signal 301 effectively masks any undesirable noise and that no notch filtering may be required. FIG. 5 shows an illustrative graph of signal 501 masking tone-like noise in region R in accordance with some embodiments. Signal 501 may represent the energy content over a certain critical band 531. Signal 501 may be representative of a particular critical band of signal 301. Within critical band 531, tone-like noise may be present only in region R. Tone suppression determination block 330 may determine that signal 501 contains a sufficient amount energy in critical band 531 to hide any tone-like noise contained in region R. In these cases, tone suppression determination block 330 may determine that no notch filtering of signal 301 is required.

Notch level selector 340 may receive signal 331 from tone suppression determination block 330 and determine an appropriate notch filter for a given band of signal 301. For example, an appropriate notch filter may correspond to any one of a family of notch filters as described with respect to FIG. 2. Notch level selector 340 may send signal 341 to notch filter bank 350 indicating which notch filters should be applied to signal 301. In some cases, notch level selector 340 may indicate that no notch filtering is necessary. In this manner, notch filtering of signal 301 can be adaptive.

Notch filter bank 350 may receive signal 341 indicating a set of notch filters that should be applied to signal 301. In response, notch filter bank 350 may apply the set of notch filters to signal 301 to produce output signal 302. Notch filter bank 350 may contain any number of families of notch filters. For example, notch filter bank 350 may contain families of notch filters similar to those described above with respect to FIG. 2.

Figure 6:
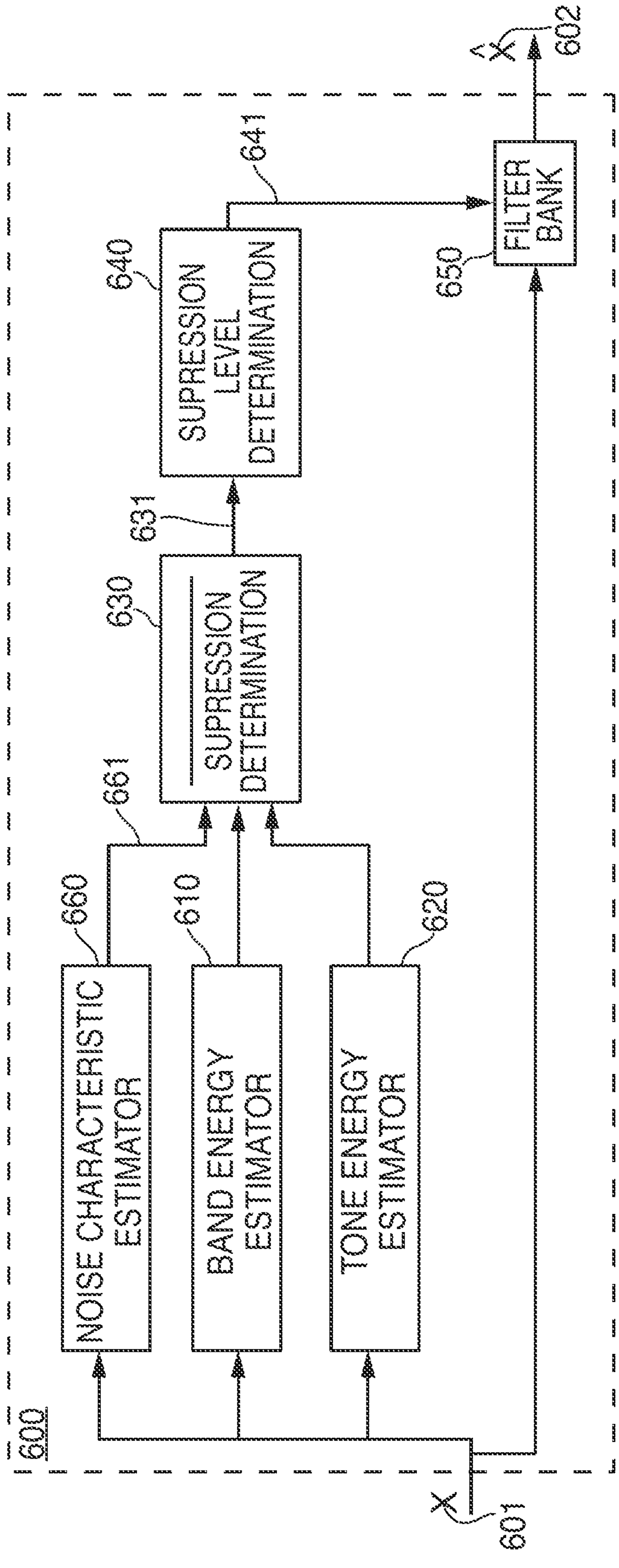
FIG. 6 is a block diagram of another system for performing psychoacoustic adaptive notch filtering, in accordance with at least one embodiment.

FIG. 6 is a block diagram of a system 600 for performing psychoacoustic adaptive notch filtering. System 600 can be employed as part of a generic noise suppressor. System 600 may be similar to system 300 in many respects and thus, may share any of the features described with respect to similarly numbered elements of system 300.

System 600 may include a band energy estimator 610, a tone energy estimator 620, a suppression determination block 630, a suppression level determination block 640, a filter bank 650, and a noise characteristic estimator 660.

Band energy estimator 610 and tone energy estimator 620 may perform similar tasks as described with respect to band energy estimation block 310 and tone energy estimation block 320 of FIG. 3, respectively.

Noise characteristic estimator 660 may estimate the characteristics of any noise present in input signal 601. For example, noise characteristic estimator 660 may be able to determine whether a given band of signal 601 contains noise-like noise or tone-like noise. To accomplish this task, noise characteristic estimator 660 may only operate during quiet periods as described with respect to tone energy estimation block 320 of FIG. 3. Noise characteristic estimator 660 may provide an output signal 661 to one or both of band energy estimator 610 and suppression determination block 630 to indicate the type of noise that signal 601 contains.

Suppression determination block 630 may operate in a similar way to tone suppression determination block 330 of FIG. 3, however, suppression determination block 630 may also account for signal 661 from noise characteristic estimator 660. For bands that contain tone-like noise, suppression determination block 630 may operate identically to suppression determination block 330 of FIG. 3. In contrast, for bands that contain noise-like noise, suppression determination block 630 may operate more similarly to a traditional noise suppressor. For example, if a given critical band contains noise-like noise, suppression determination block 630 may determine whether the entire critical band requires suppression. Suppression determination block 630 may then pass this information to suppression level determination block 640 via signal 631.

Suppression level determination block 640 may receive signal 631 from suppression determination block 630 and determine an appropriate filter for a given band of signal 601. Suppression level determination block 640 may generally operate in a manner similar to notch level selector 340. However, unlike notch level selector 340, suppression level determination block 640 may choose between both notch filters and band pass filters. For example, for bands that contain tone-like noise, suppression level determination block 640 may operate identically to notch filter selector 340 of FIG. 3. In contrast, for bands that contain noise-like noise, suppression level determination block 640 may select an appropriate band pass filter. For example, an appropriate band pass filter may correspond to any one of a family of band pass filters that have similar pass bands, but varying filter depths (i.e., similar to a family of notch filters as described with respect to FIG. 2). Suppression level determination block 640 may pass information to filter bank 650 via a signal 641.

Filter bank 650 may receive signal 641, which can indicate a set of filters that should be applied to signal 601. Filter bank 650 may operate in a manner similar to notch filter bank 350, except that filter bank 650 may contain both families of notch filters and families of band pass filters. In response to signal 641, filter bank 650 may apply the set of filters to signal 601 to produce an output signal 602.

Figure 7:
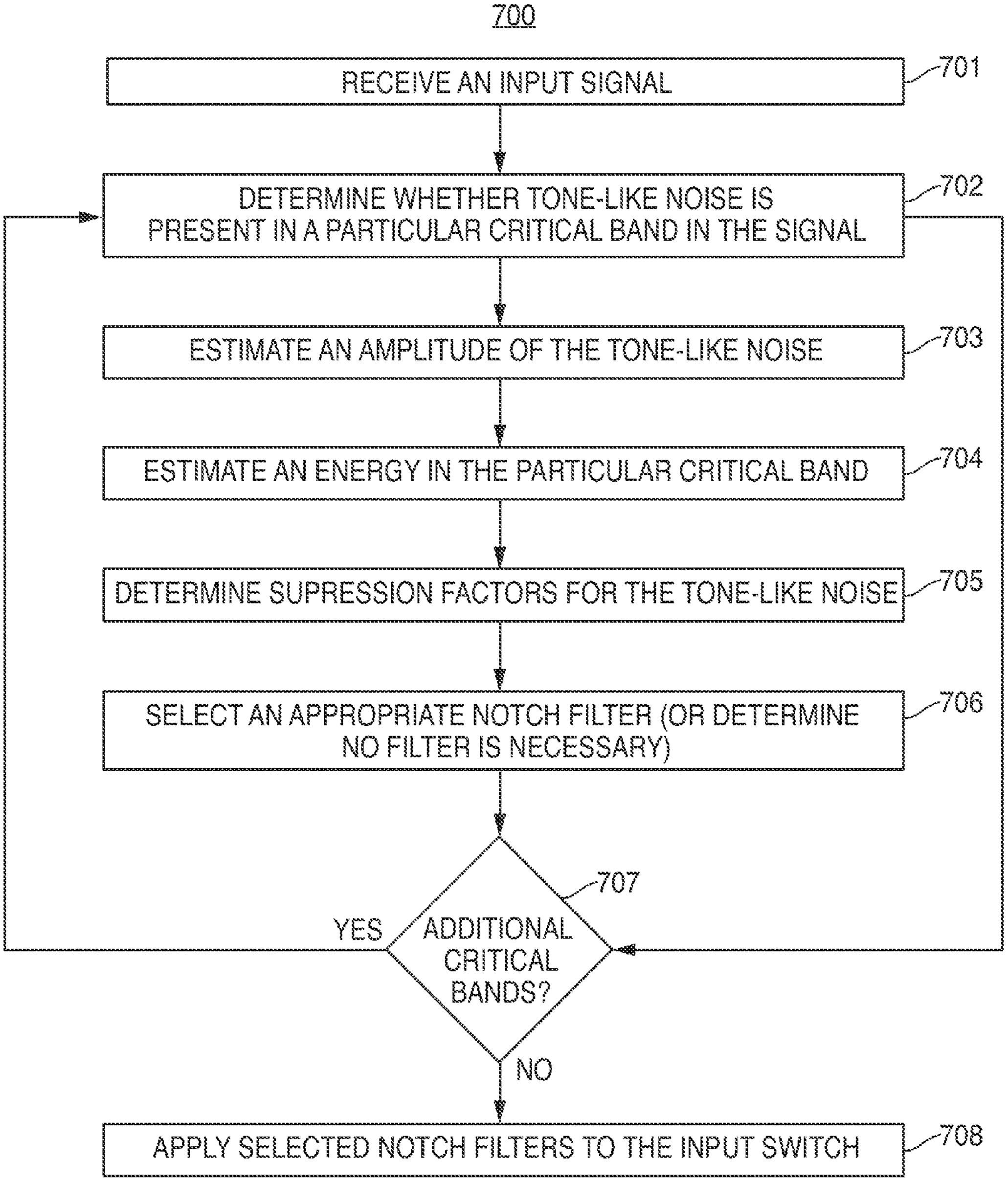
FIG. 7 is an illustrative process for performing psychoacoustic adaptive notch filtering, in accordance with at least one embodiment.

FIG. 7 shows an illustrative process for performing psychoacoustic adaptive notch filtering. At step 701, process 700 may receive an input signal. The input signal may be similar to any one of signals 101, 301, and 601. At step 702, process 700 may determine whether tone-like noise is present in a particular critical band of the signal. This may be accomplished in a similar manner as described with respect to FIGS. 3 and 6. Alternatively, the determining can be accomplished using off-line experiments. If tone-like noise is not present in the signal in the particular critical band, process 700 may proceed to step 707. Otherwise, process 700 may proceed to step 703. At step 703, process 700 may estimate an amplitude of the tone-like noise. This may be accomplished in a similar manner as described with respect to FIGS. 3 and 6. At step 704, process 700 may estimate an amount of energy in the particular critical band. This may be accomplished in a similar manner as described with respect to FIGS. 3 and 6. At step 705, process 700 may determine at least one suppression factor for the tone-like noise based on the estimated amplitude and energy. This may be accomplished in a similar manner as described with respect to FIGS. 3 and 6. If suppression factors are necessary (e.g., at least one suppression factor is required), process 700 may include selecting a notch filter based on the determined at least one suppression factor, at step 706. This may be accomplished in a similar manner as described with respect to FIGS. 3 and 6. In at least one embodiment, more than one notch filter can be selected. At step 707, process 700 may determine whether additional critical bands containing tone-like noise exist. For example, process 700 can use any one of band energy estimation block 310, tone energy estimation block 320, band energy estimator 610, and tone energy estimator 620 to determine if there are additional critical bands. If so, process 700 may return to step 702. Otherwise, process 700 may proceed to step 708. At step 708, process 700 may apply the selected notch filters to the input signal.

Figure 8:
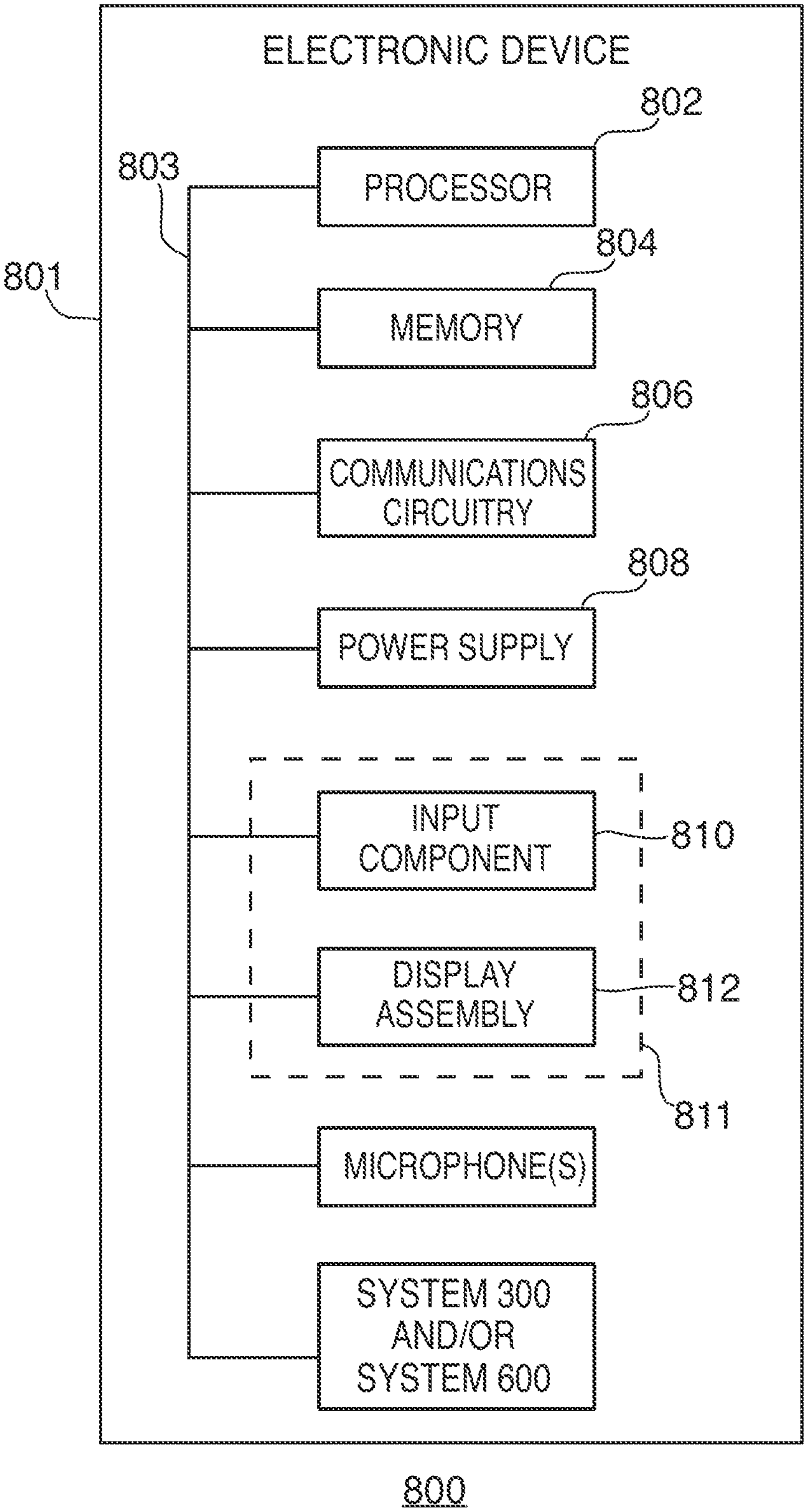
FIG. 8 shows a schematic view of an illustrative electronic device, in accordance with at least one embodiment.

FIG. 8 is a schematic view of an illustrative electronic device in accordance with an embodiment. Electronic device 800 may contain one or more of systems 300 and 600 described with respect to FIGS. 3 and 6. Electronic device 800 may be any portable, mobile, or hand-held electronic device configured to present visible information on a display assembly wherever the user travels. Alternatively, electronic device 800 may not be portable at all, but may instead be generally stationary. Electronic device 800 can include, but is not limited to, a music player, video player, still image player, game player, other media player, music recorder, movie or video camera or recorder, still camera, other media recorder, radio, medical equipment, domestic appliance, transportation vehicle instrument, musical instrument, calculator, cellular telephone, other wireless communication device, personal digital assistant, remote control, pager, computer (e.g., desktop, laptop, tablet, server, etc.), monitor, television, stereo equipment, set up box, set-top box, boom box, modem, router, keyboard, mouse, speaker, printer, and combinations thereof. In some embodiments, electronic device 800 may perform a single function (e.g., a device dedicated to displaying image content) and, in other embodiments, electronic device 800 may perform multiple functions (e.g., a device that displays image content, plays music, and receives and transmits telephone calls).

Electronic device 800 may include a housing 801, a processor or control circuitry 802, memory 804, communications circuitry 806, power supply 808, input component 810, display assembly 812, and microphones 814. Electronic device 800 may also include a bus 803 that may provide a data transfer path for transferring data and/or power, to, from, or between various other components of device 800. In some embodiments, one or more components of electronic device 800 may be combined or omitted. Moreover, electronic device 800 may include other components not combined or included in FIG. 8. For the sake of simplicity, only one of each of the components is shown in FIG. 8.

Memory 804 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 804 may include cache memory, which may be one or more different types of memory used for temporarily storing data for electronic device applications. Memory 804 may store media data (e.g., music, image, and video files), software (e.g., for implementing functions on device 800), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 800 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 806 may be provided to allow device 800 to communicate with one or more other electronic devices or servers using any suitable communications protocol. For example, communications circuitry 806 may support Wi-Fi™ (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications circuitry 906 may also include circuitry that can enable device 900 to be electrically coupled to another device (e.g., a computer or an accessory device) and communicate with that other device, either wirelessly or via a wired connection.

Power supply 808 may provide power to one or more of the components of device 800. In some embodiments, power supply 808 can be coupled to a power grid (e.g., when device 800 is not a portable device, such as a desktop computer). In some embodiments, power supply 808 can include one or more batteries for providing power (e.g., when device 800 is a portable device, such as a cellular telephone). As another example, power supply 808 can be configured to generate power from a natural source (e.g., solar power using one or more solar cells).

One or more input components 810 may be provided to permit a user to interact or interface with device 800. For example, input component 810 can take a variety of forms, including, but not limited to, a track pad, dial, click wheel, scroll wheel, touch screen, one or more buttons (e.g., a keyboard), mouse, joy stick, track ball, and combinations thereof. For example, input component 810 may include a multi-touch screen. Each input component 810 can be configured to provide one or more dedicated control functions for making selections or issuing commands associated with operating device 800.

Electronic device 800 may also include one or more output components that may present information (e.g., textual, graphical, audible, and/or tactile information) to a user of device 800. An output component of electronic device 800 may take various forms, including, but not limited, to audio speakers, headphones, audio line-outs, visual displays, antennas, infrared ports, rumblers, vibrators, or combinations thereof.

For example, electronic device 800 may include display assembly 812 as an output component. Display 812 may include any suitable type of display or interface for presenting visible information to a user of device 800. In some embodiments, display 812 may include a display embedded in device 800 or coupled to device 800 (e.g., a removable display). Display 812 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 812 can include a movable display or a projecting system for providing a display of content on a surface remote from electronic device 800, such as, for example, a video projector, a head-up display, or a three-dimensional (e.g., holographic) display. As another example, display 812 may include a digital or mechanical viewfinder. In some embodiments, display 812 may include a viewfinder of the type found in compact digital cameras, reflex cameras, or any other suitable still or video camera.

It should be noted that one or more input components and one or more output components may sometimes be referred to collectively as an I/O interface (e.g., input component 810 and display 812 as I/O interface 811). It should also be noted that input component 810 and display 812 may sometimes be a single I/O component, such as a touch screen that may receive input information through a user's touch of a display screen and that may also provide visual information to a user via that same display screen.

Processor 802 of device 800 may control the operation of many functions and other circuitry provided by device 800. For example, processor 802 may receive input signals from input component 810 and/or drive output signals to display assembly 812. Processor 802 may load a user interface program (e.g., a program stored in memory 804 or another device or server) to determine how instructions or data received via an input component 810 may manipulate the way in which information is provided to the user via an output component (e.g., display 812). For example, processor 802 may control the viewing angle of the visible information presented to the user by display 812 or may otherwise instruct display 812 to alter the viewing angle.

Microphones 814 can include any suitable number of microphones integrated within device 800. The number of microphones can be one or more.

Electronic device 800 may also be provided with a housing 801 that may at least partially enclose one or more of the components of device 800 for protecting them from debris and other degrading forces external to device 800. In some embodiments, one or more of the components may be provided within its own housing (e.g., input component 810 may be an independent keyboard or mouse within its own housing that may wirelessly or through a wire communicate with processor 802, which may be provided within its own housing).

The systems and methods described herein may each be implemented by software, but may also be implemented in hardware, firmware, or any combination of software, hardware, and firmware. They each may also be embodied as machine-readable code recorded on a machine-readable medium. The machine-readable medium may be any data storage device that can store data that can thereafter be read by a computer system. Examples of the machine-readable medium may include, but are not limited to, read-only memory, random-access memory, flash memory, CD-ROMs, DVDs, magnetic tape, and optical data storage devices. The machine-readable medium can also be distributed over network-coupled computer systems so that the machine-readable code is stored and executed in distributed fashion.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is understood that one or more features of an embodiment can be combined with one or more features of another embodiment to provide systems and/or methods without deviating from the spirit and scope of the invention.

Moreover, the previously described embodiments are presented for purposes of illustration and not of limitation. Those skilled in the art will appreciate that the invention can be practiced by other than the described embodiments, and the invention is limited only by the claims which follow.

What is claimed is:

1. A method for performing adaptive notch filtering, the method comprising:

receiving an input signal containing tone-like noise having a power spectral density that includes at least one peak;

determining whether tone-like noise is present in a particular critical band of the input signal, including analyzing the input signal to determine a frequency for the at least one peak and to determine whether the frequency is within the critical band; and in response to a determination that the tone-like noise is present:

estimating an amplitude of the tone-like noise; and estimating how much energy is contained in the particular critical band;

determining at least one suppression factor for the tone-like noise based on the estimated amplitude and energy;

selecting a notch filter based on the determined at least one suppression factor; and applying the selected notch filter to the input signal.

2. The method of claim 1, wherein determining whether tone-like noise is present comprises:

applying a predefined notch filter to the input signal to generate a filtered signal.

3. The method of claim 2, wherein determining whether tone-like noise is present further comprises:

calculating a signal power in the filtered signal.

4. The method of claim 3, wherein determining whether tone-like noise is present further comprises:

comparing the calculated signal power with a signal power of the input signal.

5. The method of claim 1, wherein determining at least one suppression factor comprises:

determining at least one notch filter level.

6. A method for performing adaptive notch filtering, the method comprising:

receiving an input signal containing tone-like noise having a power spectral density that includes at least one peak;

determining how much energy is contained in at least one predefined frequency band of the input signal;

determining a level of tone-like noise present in the at least one predefined band based on the determined amount of energy, including analyzing the input signal to determine a frequency for the at least one peak within the at least one predefined band;

selecting a notch filter based on the determined level; and applying the selected notch filter to the input signal.

7. The method of claim 6, wherein determining how much energy comprises:

applying at least one band pass filter to the input signal.

8. The method of claim 6, wherein determining the level of tone-like noise occurs only when the determined amount of energy is less than a predetermined amount of energy.

9. The method of claim 6, wherein determining the level of tone-like noise comprises:

applying at least one particular notch filter to the input signal to generate a filtered signal; and comparing the filtered signal and the input signal.

10. The method of claim 6 further comprising:

determining, prior to selecting, whether suppression of the tone-like noise is required based on the determined level.

11. The method of claim 10, wherein selecting is performed in response to a determination that suppression of the tone-like noise is required.

12. An electronic device comprising:

a receiver configured to receive an input signal containing tone-like noise having a power spectral density that includes at least one peak, and an adaptive notch filtering system configured to:

determine how much energy is contained in at least one predefined frequency band of the input signal;

determine a level of tone-like noise present in the at least one predefined band based on the determined amount of energy, including analyzing the input signal to determine a frequency for the at least one peak within the at least one predefined band;

select a notch filter based on the determined level; and apply the selected notch filter to the input signal.

13. The electronic device of claim 12, wherein the receiver comprises an audio receiver.

14. The electronic device of claim 12, wherein the input signal comprises an audio signal.

15. The electronic device of claim 12, wherein the filtering system comprises a psychoacoustic adaptive notch filtering system.

16. The electronic device of claim 12, wherein the filtering system is configured to determine the amount of energy by applying at least one band pass filter to the input signal.

17. The electronic device of claim 12, wherein the filtering system is configured to determine the level of tone-like noise only when the determined amount of energy is less than a predetermined energy.

18. The electronic device of claim 12, wherein the filtering system is configured to determine the level of tone-like noise by:

applying at least one particular notch filter to the input signal to generate a filtered signal; and comparing the filtered signal and the input signal.

19. The electronic device of claim 12, wherein, prior to the selection of the notch filter, the filtering system is further configured determine whether suppression of the tone-like noise is required based on the determined level.

20. The electronic device of claim 19, wherein the filtering system is configured to select the notch filter in response to a determination that suppression of the tone-like noise is required.

21. A non-transitory computer readable medium storing a program configured to cause a computer to execute an adaptive notch filtering process, the filtering process comprising:

identifying an input signal containing tone-like noise having a power spectral density that includes at least one peak;

determining how much energy is contained in at least one predefined frequency band of the input signal;

determining a level of tone-like noise present in the at least one predefined band based on the determined amount of energy, including analyzing the input signal to determine a frequency for the at least one peak within the at least one predefined band;

selecting a notch filter based on the determined level; and applying the selected notch filter to the input signal.

* * * * *